(12) United States Patent
Berton et al.

(10) Patent No.: US 10,378,574 B2
(45) Date of Patent: Aug. 13, 2019

(54) POLYGONAL DRIVING MEANS WITH INBUILT COLLAR

(71) Applicant: LISI AEROSPACE, Paris (FR)

(72) Inventors: Anthony Berton, Pontoise (FR); Nicolas Guerin, Mery sur Oise (FR)

(73) Assignee: LISI Aerospace, Paris (FR)

( * ) Notice: Subject to any disclaimer, the term of this patent is extended or adjusted under 35 U.S.C. 154(b) by 0 days.

(21) Appl. No.: 16/024,897

(22) Filed: Jul. 1, 2018

(65) Prior Publication Data

US 2018/0335066 A1 Nov. 22, 2018

Related U.S. Application Data

(62) Division of application No. 13/125,081, filed as application No. PCT/FR2009/051990 on Oct. 19, 2009, now Pat. No. 10,030,685.

(30) Foreign Application Priority Data

Oct. 20, 2008 (FR) ...................................... 08 57127
Mar. 4, 2009 (FR) ...................................... 09 51378

(51) Int. Cl.
*F16B 37/00* (2006.01)
*F16B 23/00* (2006.01)
*F16B 33/06* (2006.01)

(52) U.S. Cl.
CPC .......... *F16B 23/0061* (2013.01); *F16B 37/00* (2013.01); *F16B 33/06* (2013.01)

(58) Field of Classification Search
CPC .................................................. F16B 23/0061

(Continued)

(56) References Cited

U.S. PATENT DOCUMENTS

| 111,996 A | 2/1871 | Washbourne |
| D206,402 S | 12/1966 | Wing |

(Continued)

FOREIGN PATENT DOCUMENTS

| EP | 1055828 A2 | 11/2000 |
| FR | 2252741 A | 6/1975 |

(Continued)

OTHER PUBLICATIONS

Heinzler, Marcus, French Search Report, FR0951378, dated Nov. 30, 2009, 2 pages, INPI.

(Continued)

*Primary Examiner* — Gary W Estremsky
(74) *Attorney, Agent, or Firm* — Henricks Slavin LLP

(57) ABSTRACT

It has become apparent that the dimensions of inbuilt-collar driving means of the same nominal size may vary according to the method of manufacture. The dimensions of the collar must therefore be adapted to suit the mode of manufacture, at the expense of its strength or mass. Moreover, the transmissible torque for tightening and loosening operations varies according to a useful wrenching height. In order to have a useful height identical to the height of the shank (7), the idea underlying the invention involves pushing the frustoconical collar (152) of a driving means (151) in towards its center along the extension of the sides of the shank. The inbuilt-collar driving means proposed by the invention is suited to all modes of manufacture, and can be manufactured without adversely affecting the dimensions of the driving means or its installation.

8 Claims, 6 Drawing Sheets

(58) Field of Classification Search
USPC .......................................... 411/402, 397, 427
See application file for complete search history.

(56) References Cited

U.S. PATENT DOCUMENTS

| | | | |
|---|---|---|---|
| 4,269,248 A | 5/1981 | MacLean et al. | |
| 4,281,699 A | 8/1981 | Grube | |
| 4,361,412 A | 11/1982 | Stolarczyk | |
| 4,362,449 A * | 12/1982 | Hlinsky | B60B 3/145 411/156 |
| 4,681,496 A | 7/1987 | Fasolino | |
| 4,856,954 A | 8/1989 | Peterson | |
| D320,162 S | 9/1991 | Sorenson | |
| 5,324,148 A * | 6/1994 | Notaro | F16B 35/00 411/373 |
| 5,380,070 A | 1/1995 | FitzGerald | |
| 5,395,196 A | 3/1995 | Notaro | |
| 5,431,518 A | 7/1995 | Young et al. | |
| 5,730,568 A * | 3/1998 | Lanham | B60B 3/145 411/428 |
| 5,741,103 A | 4/1998 | Lee | |
| 6,045,311 A | 4/2000 | Chang | |
| 6,116,833 A | 9/2000 | Ellis | |
| 6,158,310 A | 12/2000 | Goss et al. | |
| 6,435,791 B1 * | 8/2002 | Bydalek | B60B 3/145 411/371.2 |
| 8,347,761 B2 | 1/2013 | Goss | |
| 2006/0162507 A1 | 7/2006 | Ito | |
| 2009/0197724 A1 | 8/2009 | Young | |

FOREIGN PATENT DOCUMENTS

| | | |
|---|---|---|
| GB | 1481442 | 7/1977 |
| JP | S51-91657 U | 7/1976 |
| JP | S55-24573 U | 2/1980 |
| JP | S55-155910 A | 12/1980 |
| JP | 2001-020926 A | 1/2001 |
| JP | 2002-0257117 A | 9/2002 |
| JP | 2003-120640 A | 4/2003 |
| JP | 2004-340211 A | 12/2004 |
| JP | 2007-321798 A | 12/2007 |

OTHER PUBLICATIONS

Heinzler, Marcus, International Search Report, PCT/FR2009/051990, dated Feb. 10, 2010, 2 pages, EPO.

* cited by examiner

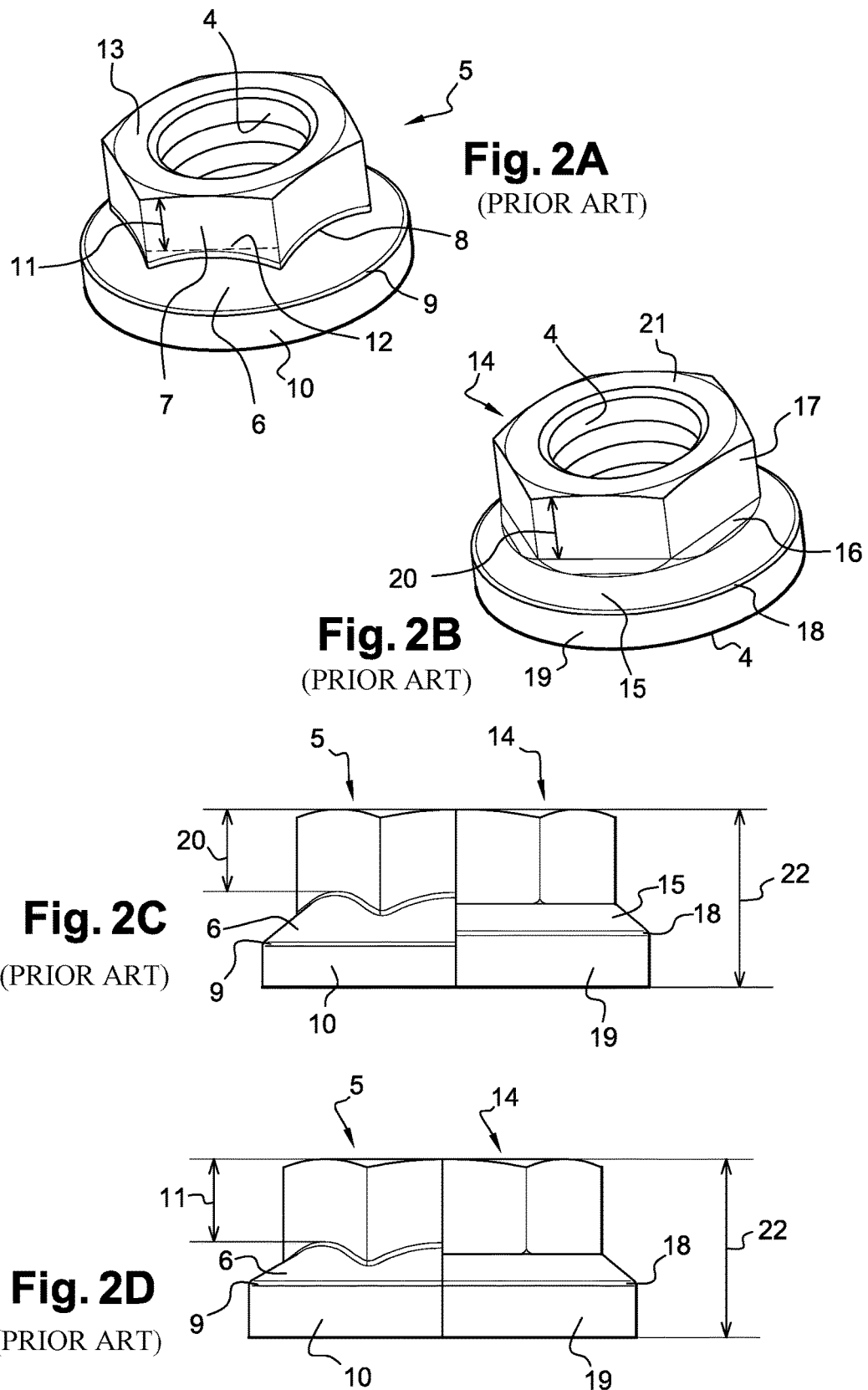

POLYGONAL DRIVING MEANS WITH INBUILT COLLAR

CROSS REFERENCE TO RELATED APPLICATIONS

This is a divisional of U.S. application Ser. No. 13/125,081, filed Jun. 6, 2011, patented, which is a Section 371 application of PCT/FR2009/051990 filed Oct. 19, 2009, which claims priority from French Patent Application Number 0857127 filed Oct. 20, 2008 and French Patent Application Number 0951378 filed Mar. 4, 2009, each of which is incorporated by reference herein in their entirety.

BACKGROUND

This invention relates to a polygonal driving means with an inbuilt collar and fitted with socket faces. The technical field of the invention relates, in a general manner, to that of driving means. More particularly, the invention relates to nuts and screws with inbuilt frustoconical-type collars.

In the prior art, the teaching particularly of model USD206402 is known and describes a reinforced nut with a frustoconical collar, represented in a schematic manner in FIGS. 1A and 1B.

FIG. 1A represents a front view of such a nut 1 and FIG. 1B represents a side view with a partial cross-section of the same nut 1. The cross-section is defined by planes 1B-1B. The nut 1 comprises a shank 2 and a frustoconical collar 3. A cylindrical inner wall 4 of the nut 1 is threaded and may have a recess. Six buttresses 5 connect the collar 3 to the shank 2.

In the prior art, non-reinforced nuts with frustoconical collars are also known, such as those represented in FIGS. 2A and 2B. The same types of geometries are found with regard to the screw heads.

FIG. 2A represents in a schematic manner an oblique perspective view of an example of a forged nut 5 with a frustoconical collar 6. A junction between a hexagonal shank 7 and the frustoconical collar 6 of the forged nut 5 comprises a fillet present in the form of an elliptical rim 8. A circular base 9 of the cone of the collar 6 extends into a cylinder 10. When a wrench socket, not represented, is threaded around the shank 7, one end of the socket abuts against the elliptical rim 8. A height 11, separating a crest 12 of the elliptical rim from an upper surface 13 of the forged nut 5, is effectively in contact with the wrench socket during a tightening or loosening operation of the forged nut 5; this is the wrenching height or useful height 11. The cylindrical inner wall 4 of the forged nut 5 is threaded and may have a recess.

FIG. 2B represents in a schematic manner an oblique perspective view of an example of a machined nut 14 with a frustoconical collar 15. A junction 16 between a hexagonal shank 17 and the frustoconical collar 15 of the machined nut 14 is machined so as to form a fin and so that the shank 17 has perfectly rectangular sides. A circular base 18 of the cone of the collar 15 extends into a cylinder 19. When a wrench socket, not represented, is threaded around the shank 17, one end of the socket abuts against the junctions 16. A useful height 20, separating a junction 16 from an upper surface 21 of the machined nut 14, is effectively in contact with the wrench socket during a tightening or loosening operation of the machined nut 14. The cylindrical inner wall 4 of the machined nut 14 is threaded and may have a recess.

For nuts with identical dimensions, the useful height 11 of the forged nut 5 is therefore shallower than the useful height 20 of the machined nut 14. Due to the elliptical rims 8, the support surface with the appropriate wrench socket is less significant, which reduces the transmissible torque.

FIG. 2C schematically represents a side view of half of a forged nut 5 with a frustoconical collar 6 and half of a machined nut 14 with a frustoconical collar 15 from the prior art. This figure shows, for the same overall height 22, collars 15 and 6 to be different and the wrenching height 20 to be identical. In particular, the cylindrical part 10 is shallower than the cylindrical part 19.

FIG. 2D schematically represents a side view of half of a forged nut 5 with a frustoconical collar 6 and half of a machined nut 14 with a frustoconical collar 15 from the prior art. This figure shows collars 15 and 6 to be identical and the wrenching height 11 of the forged nut 5 to be shallower than that 20 of the machined nut 14.

It has become apparent that the dimensions of the collar nuts of the same nominal size, i.e. of the same inner threading, may vary according to the method of manufacture. This also applies for all driving means such as screw heads. This is why, in the following text, it must be remembered that the invention relates to all driving means with an inbuilt collar.

It is initially advised that, if the useful wrenching height is to be kept the same for both a forged driving means and a machined driving means, the height of the shank must be increased by a length equal to the height of a rim, the total height of the driving means therefore being increased to the same extent.

This heterogeneity of shank heights for driving means intended for the same use is a source of numerous technical problems.

Indeed, as the shank height of a forged driving means is greater than that of a shank of a machined driving means, the forged driving means have a greater volume, therefore a greater mass and more material, which is problematic and costly with regard to their storage, transport and use, in particular in aircraft.

If, on the other hand, the height of the collar is reduced, this reduction is detrimental to the mechanical aspect, i.e. the strength of the collar.

Finally, as the forged driving means are generally produced in large quantities compared to the machined driving means, the aforementioned problems are all the more incapacitating.

On the machined version, numerous fins can be observed in a transition zone between the hexagonal socket faces and the collar. These fins originating from the machining process are not suited to forging. Indeed, identical angular shapes cannot be forged as this creates material filling problems. Furthermore, for the forged version, elliptical fillets replace the machining fins to ease the filling of a die with the chosen material such as a titanium alloy, stainless steel, nickel alloy or even an aluminium alloy.

It therefore follows that, for the same wrenching height and the same height of the driving means, the machined driving means and the forged driving means do not have the same collar height. The collar strength is therefore weaker on a forged driving means.

In order to produce equal levels of strength between the machined collar and the forged collar, either the height of the forged driving means must be increased, which has the disadvantage of making it heavier than the machined driving means, or the wrenching height reduced, which reduces the transmissible torque for tightening and loosening operations.

SUMMARY

The inbuilt-collar solution proposed by the invention is suited to all modes of manufacture such as machining, forging, sintering, casting and plastic injection moulding, and can be manufactured without adversely affecting the dimensions of the driving means, its strength or its mode of installation.

The main modification was provided to the collar, where a recess at the bottom of each socket face avoids the need for elliptical rims produced by the forging method.

Fillets are fitted between the socket faces and the sides of the hexagonal shank of the driving means, preferably rays or ellipses or any other form providing for a good flow of material during forging.

In the prior art, during a screwing or unscrewing operation of a driving means using a power tool, the rotation speed of the driving means leads to a significant increase in the temperature of the driving means, via friction.

This raised temperature is the source of various technical problems:
the operator may burn himself/herself while manually holding the screw or nut,
the material on which the screwing operation is performed may become damaged and deformed, above all if this is made out of composite material such as that used in aeronautics,
the coating, for example anticorrosion and/or lubricating coating, covering the screw or nut, may become deteriorated, which is detrimental to its efficiency,
the braking system, applied to some nuts to prevent them from loosening once fitted, may become degraded.

The invention has numerous advantages.

A recess made at the bottom of each socket face leads to a reduction in the mass of the driving means. This recess does not affect the mechanical strength of the driving means, as the hollowed out area is subject to very little mechanical stress. Ideally, a driving means such as that represented in FIG. 10 corresponds to a maximal recess in terms of mass.

The design is universal, thus making all modes of manufacture possible without requiring major dimensional changes. The wrenching height no longer poses a problem and the mass remains identical.

A single-shaped driving means of the same nominal size, for whatever method of manufacture, enables the driving means and its height to be more easily recognised visually.

The star-shaped recesses produced on the collar can take several different shapes, as represented in FIGS. 3 to 10. Moreover, this type of solution can be applied to a bi-hexagonal driving means.

The inbuilt collar according to the invention, due to its reduced mass via recesses in the material, has increased thermal diffusion properties, which reduces the amplitude and duration of the temperature rise of the driving means during screwing and/or unscrewing operations, and resolves at least in part the aforementioned problems.

Thus, the idea underlying the invention involves deleting the elliptical rims 8 in order to create a useful height identical to the height of the shank. In order to achieve this, the frustoconical collar is pushed in towards its center along the extension of the sides of the shank.

Via this invention, the same dimensions are obtained for driving means in machined mode and forged mode, leading to an identical mass and the same wrenching heights and therefore to identical transmissible torques.

The star-shaped collar solution proposed overcomes the restrictions related to the method of manufacture with regard to the dimensions of the driving means, and produces a reduction in mass with identical strength and wrenching heights. The star shape enables a more significant tightening and loosening torque to be transmitted by using a tool adapted to suit this shape.

The socket faces generated by the invention allow for the simple production of different colorings or markings such as the part reference number, a diameter marker or the material used, which up to now have been difficult to produce on a driving means with a classic collar.

The invention therefore relates to a polygonal driving means with an inbuilt collar, obtained by forging via a die or by machining, characterised in that the collar comprises socket faces, hollowed out with regard to a collar surface and aligned with the lateral sides of the driving means.

The invention also relates to a cylindrical tightening and loosening wrench socket for a polygonal driving means according to the invention, the wrench socket comprising a cavity with a polygonal hollow shank and an end fitted so as to be abutted against an inbuilt collar of the driving means, the end of the wrench socket having sides with shapes complementing those of the collar so as to be pressed against the latter during the abutment, characterised in that the collar comprises socket faces hollowed out with regard to a collar surface and aligned with the lateral sides of a shank of the driving means.

BRIEF DESCRIPTION OF THE DRAWINGS

The invention and its different applications will be better understood after reading the following description and after examining the accompanying figures. These are intended for purposes of illustration only and are not intended to limit the scope of the invention. The figures show:

FIG. 2A, previously described: a schematic representation of an oblique perspective view of an example of a forged nut with a frustoconical collar from the prior art;

FIG. 2B, previously described: a schematic representation of an oblique perspective view of an example of a machined nut with a frustoconical collar from the prior art;

FIG. 2C, previously described: a schematic representation of a side view of half of a forged nut with a frustoconical collar and half of a machined nut with a frustoconical collar from the prior art;

FIG. 2D, previously described: a schematic representation of a side view of half of a forged nut with a frustoconical collar and half of a machined nut with a frustoconical collar from the prior art;

DETAILED DESCRIPTION

Figure 1A:
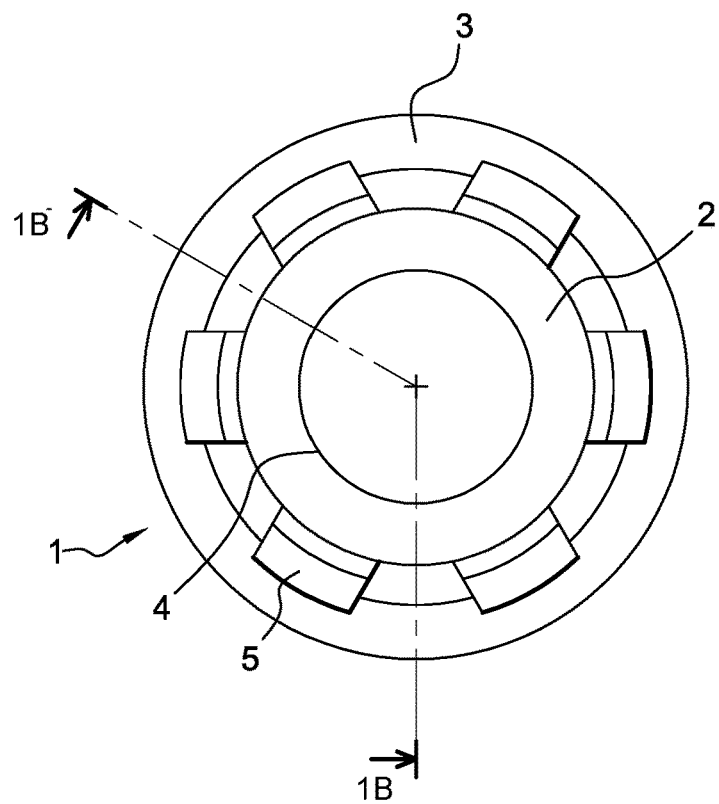
FIG. 1A, previously described: a schematic representation of a front view of an example of a reinforced nut from the prior art.
Figure 1B:
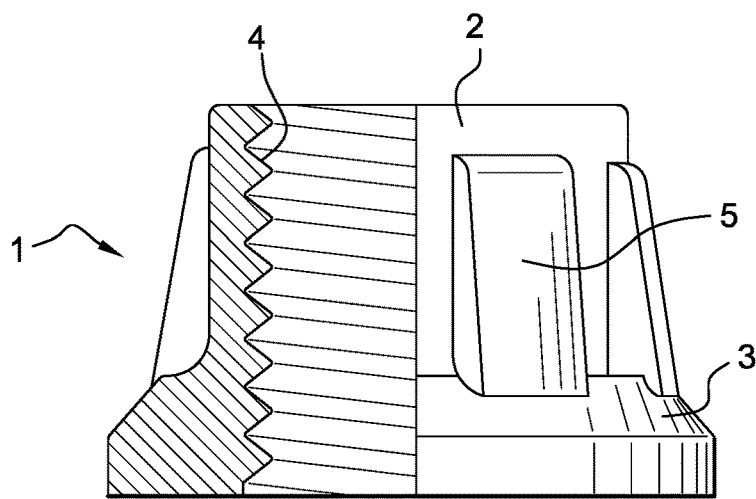
FIG. 1B, previously described: a schematic representation of a side view with a partial cross-section of the same example of a nut.
Figure 3A:
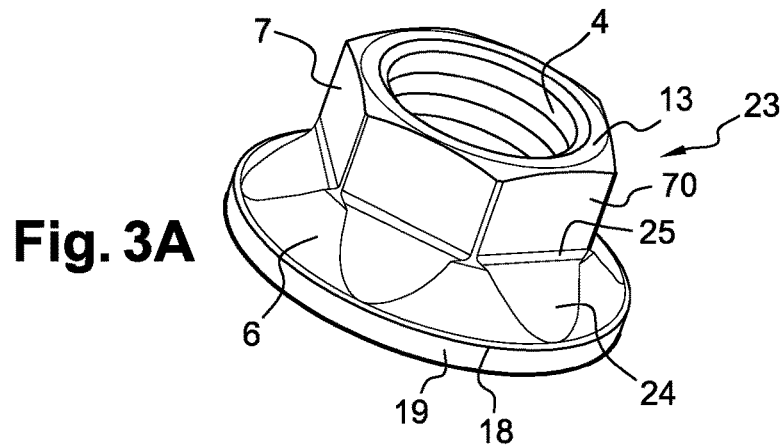
FIG. 3A: a schematic representation of an oblique perspective view of a first example of a nut with a driving means with a frustoconical collar according to the invention.

FIG. 3A represents, in a schematic manner, an oblique perspective view of a first example of a nut with a driving means 23 with a frustoconical collar 6 according to the invention. In one example, the driving means 23 and its embodiments represented in the following figures are obtained by forging via a die. Alternatively, said driving means may also be obtained via another mode of manufacture such as, for example, machining, casting, plastic injection moulding and sintering, so as to produce driving means with an identical use from whatever mode of manufacture. The driving means 23 comprises a polygonal shank, in this example hexagonal in shape 7 and a frustoconical collar 6. According to the invention, the collar 6 is fitted with hollowed out socket faces 24. In the example given in FIG. 3, the socket faces 24 are planar. According to the invention, hollowed out means that a portion of the side is misaligned inwards with regard to the frustoconical curved surface. A circular base 18 of the cone of the collar 6 extends into a cylinder 19. The driving means 23 comprises fillets 25 fitted between the socket faces 24 and the flat lateral sides 70 of the shank 7. In a preferred example, the driving means 23 and its embodiments described hereinafter are made out of a titanium alloy and covered with an organic resin-based coating containing polytetrafluoroethylene, also known as PTFE. Alternatively, this may be made out of stainless steel, a nickel alloy or an aluminium alloy. The cylindrical inner wall 4 of the machined driving means 23 is threaded and may have a recess.

Figure 3B:
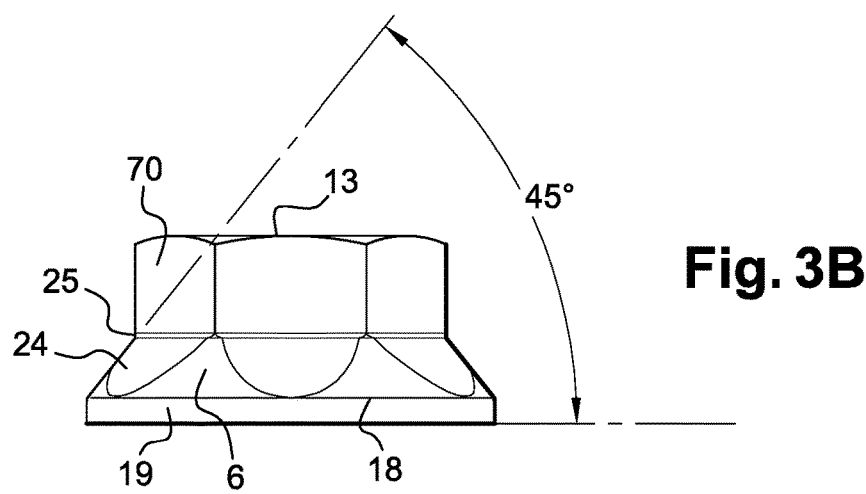
FIG. 3B: a schematic representation of a side view of the first example of a nut with a driving means with a frustoconical collar according to the invention.

FIG. 3B schematically represents a side view of the first example of a nut with a driving means 23 with a frustoconical collar 6 according to the invention. Typically, the frustoconical surface of the collar 6 forms an angle of at least forty-five degrees with the plane of the circular base 18 considered as being horizontal.

Figure 4:
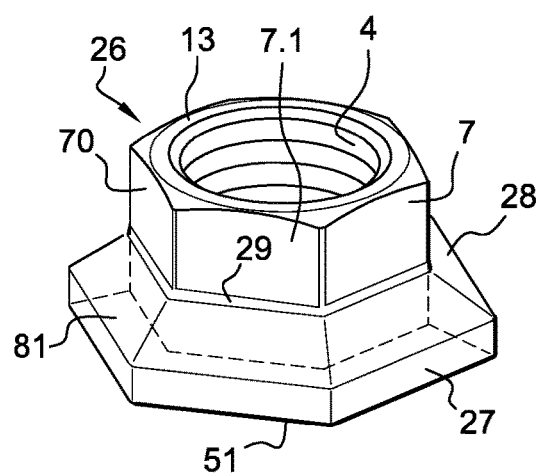
FIG. 4: a schematic representation of an oblique perspective view of a second example of a nut with a driving means according to the invention.

FIG. 4 schematically represents an oblique perspective view of a second example of a nut with a driving means 26 according to the invention. In this example, the driving means 26 comprises a hexagonal shank 7 and has a hexagonal pyramidal collar 28. The planar socket faces 81 in this example make up the collar 28. A hexagonal base 51 of the pyramid of the collar 28 extends into a parallelepiped 27. The driving means 26 comprises fillets 29 fitted between the socket faces 81 of the collar 28 and its flat lateral sides 70. The cylindrical inner wall 4 of the machined driving means 26 is threaded and may have a recess.

Figure 5:
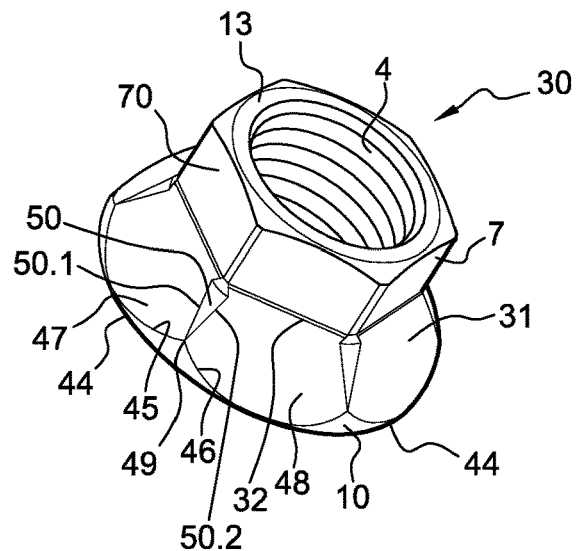
FIG. 5: a schematic representation of an oblique perspective view of a third example of a nut with a driving means according to the invention.

FIG. 5 schematically represents an oblique perspective view of a third example of a nut with a driving means 30 according to the invention. In this example, the driving means 30 comprises a hexagonal shank 7 and a semi-cylindrical 10, semi-frustoconical 50 collar and is fitted with socket faces 31 with regard to the frustum. In this example, the socket faces 31 are planar with significant inclines. More precisely, the socket faces 31 intersect the cylinder 10 at a periphery of a lower side 44 of the driving means 30. The socket faces 31 have elliptical segments 45 and 46 at the junction with this cylinder 10. Two adjacent socket faces 47 and 48, from all of the socket faces 31, therefore join together at the junction 49 between the two elliptical segments 45 and 46. Rather than comprising a fin corresponding to the junction between these two socket faces 47 and 48, the collar 10 comprises, at this junction, a portion of frustoconical connection surface 50, almost triangular in shape, as its two longest sides 50.1 and 50.2 are elliptical with very little curvature. The driving means 30 comprises fillets 32 fitted between the socket faces 31 and the flat lateral sides 70. The cylindrical inner wall 4 of the machined driving means 30 is threaded and may have a recess.

Figure 6:
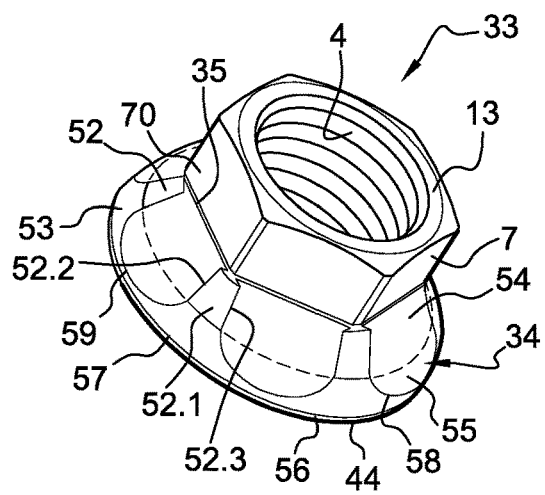
FIG. 6: a schematic representation of an oblique perspective view of a fourth example of a nut with a driving means according to the invention.

FIG. 6 schematically represents an oblique perspective view of a fourth example of a nut with a driving means 33 according to the invention. The driving means 33 comprises a hexagonal shank 7 and a semi-frustoconical 52, semi-rounded 53 collar fitted with socket faces 34 in the form of lugs. A circular base 56 of the cone of the rounded part 53 extends into a thin cylinder 57. The socket faces 34 are planar. The driving means 33 comprises fillets 35 fitted between the planar part 54 of the socket faces 34 and the flat lateral sides 70. An upper part 54 of the socket faces 34 intersects the frustoconical part 52 so as to leave one portion of frustoconical connection surface 52.1 only, almost trapezium in shape as its two longest sides 52.2 and 52.3 are elliptical with very little curvature. The lower part 55 of the socket faces 34 intersects the rounded part 53 and thus forms, at this junction, an elliptical segment 58 with significant curvature, the crest 59 of which almost touches the circular base 56. Alternatively, the socket face is parallel to a cone's generator for the collar and thus forms, at the junction, two rectilinear segments. The cylindrical inner wall 4 of the machined driving means 33 is threaded and may have a recess.

Figure 7:
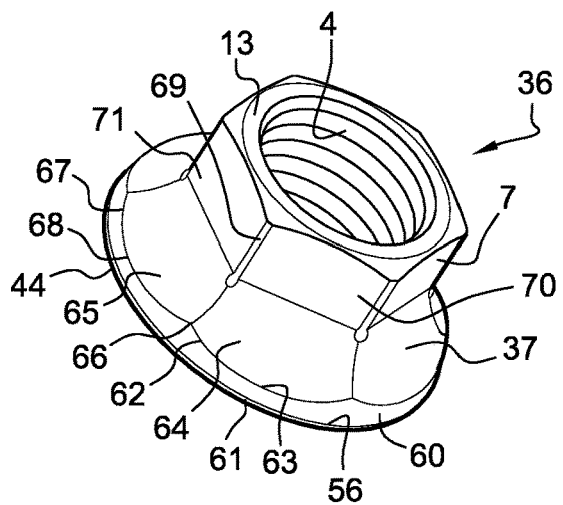
FIG. 7: a schematic representation of an oblique perspective view of a fifth example of a nut with a driving means according to the invention.

FIG. 7 schematically represents an oblique perspective view of a fifth example of a nut with a driving means 36 according to the invention. The driving means 36 comprises a hexagonal shank 7 and a frustoconical collar 60 fitted with concave socket faces 37. A circular base 56 of the cone of the collar 60 extends into a thin cylinder 61. The socket faces 37 intersect the frustoconical collar 60 and thus form, at these junctions, elliptical segments 62 and 67, the crests 63 and 68 of which almost touch the circular base 56. Two adjacent socket faces 64 and 65, from all of the socket faces 37, therefore join together at the junction 66 between the two elliptical segments 62 and 67 and form a concave fin 68 extending to a straight fin 69 separating two flat sides 70 and 71 from the six sides of the hexagonal shank 7. The cylindrical inner wall 4 of the machined driving means 36 is threaded and may have a recess.

Figure 8:
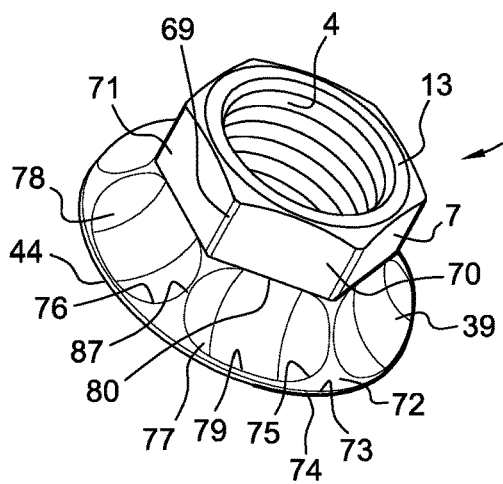
FIG. 8: a schematic representation of an oblique perspective view of a sixth example of a nut with a driving means according to the invention.

FIG. 8 schematically represents an oblique perspective view of a sixth example of a nut with a driving means 38 according to the invention. The driving means 38 comprises a hexagonal shank 7 and a frustoconical collar 72 fitted with concave socket faces 39. A circular base 73 of the cone of the collar 72 extends into a thin cylinder 74. The socket faces 29 intersect the frustoconical collar 72 and thus form, at these junctions, hemispherical segments 75 and 76. Two adjacent socket faces 77 and 78, from all of the socket faces 39, join together at a junction point 87 between the two elliptical segments 75 and 76, said junction point 87 being on the same axis as a straight fin 69 separating two flat sides 70 and 71 from the six sides of the hexagonal shank 7. A lower crest 79 of the segment 75 almost touches the circular base 73. An upper crest 87 of the segment 75 continuously joins the side 70; i.e. without a fillet. The cylindrical inner wall 4 of the machined driving means 38 is threaded and may have a recess.

Figure 9:
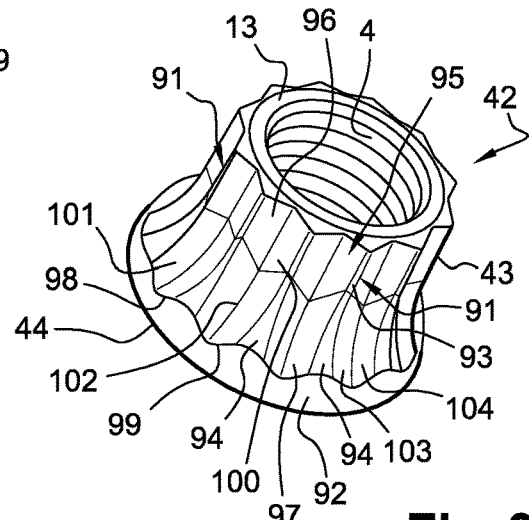
FIG. 9: a schematic representation of an oblique perspective view of a seventh example of a nut with a driving means according to the invention.

FIG. 9 schematically represents an oblique perspective view of a seventh example of a nut with a driving means 42 according to the invention. The driving means 42 comprises a bi-hexagonal shank 91 and a frustoconical collar 92 fitted with twelve socket faces 95 in furrows 102. The furrows 102 separate the socket faces 95 into two sides 103 and 104. The sides of the shank 91 have a cylindrical part 93 and a concave part 94. The socket faces 95 have a flat part 96 and a concave part 97. The socket faces 95 intersect the frustoconical collar 92 and thus form, at these junctions, saw-toothed segments 98 and 99. Two adjacent socket faces 100 and 101 from all of the socket faces 95 intersect the frustoconical collar 92 so as to leave a small connection part 93 and 94 only of the twelve sides of the shank 91. The cylindrical inner wall 4 of the machined driving means 42 is threaded and may have a recess.

Figure 10:
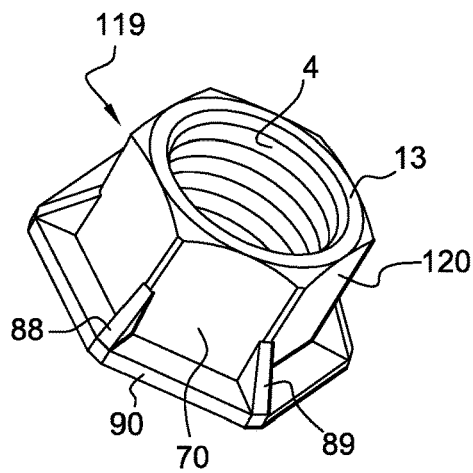
FIG. 10: a schematic representation of an oblique perspective view of a minimised model of a nut with a driving means according to the invention.

FIG. 10 schematically represents an oblique perspective view of a minimised model of a nut with a driving means 119 according to the invention, corresponding to a maximal recess in the material, not adversely affecting the mechanical strength, with buttresses 88 and 89 located on either side of the alignment of a side 70 of the shank 120, large in height compared to the previous embodiments of the driving means. Buttresses 88 and 89 are present in the form of two thin right-angled triangles. The buttresses 88 and 89 are connected by their lower base via a thin, flat hexagonal collar 90. The cylindrical inner wall 4 of the machined driving means 119 is threaded and may have a recess.

Figure 11:
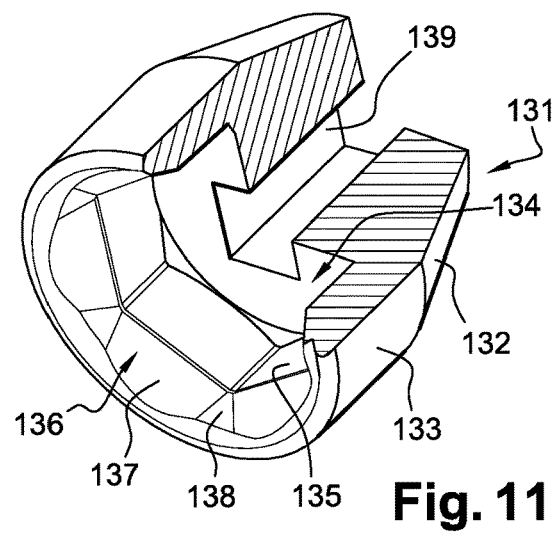
FIG. 11: a schematic representation of an oblique perspective view of a wrench socket with a partial cross-section for the first example of a driving means according to the invention.

FIG. 11 schematically represents an oblique perspective view of a wrench socket 131 with a partial cross-section according to the invention. The wrench socket 131 has a semi-frustoconical 132, semi-cylindrical 133 outer shape. Such a wrench socket is intended for tightening and loosening operations for one of the driving means 23, 26, 30, 33, 36, 38, 42, or 119 according to the invention, represented in the previous figures. In this example, the wrench socket 131 comprises a cavity 134 with a polygonal hollow shank 135, in this case hexagonal in shape, and an end 136 fitted so as to be abutted against the frustoconical collar 6 of the driving means 23 represented in FIG. 3. The end 136 has two sides 137 and 138 with shapes complementing those of the socket faces 24 and of the collar 6 of the driving means 23 so as to be pressed against them during the abutment. Finally, the wrench socket 131 comprises a square hollow shank 139 intended to accommodate one end of a tightening and loosening wrench, not represented.

Figure 12:
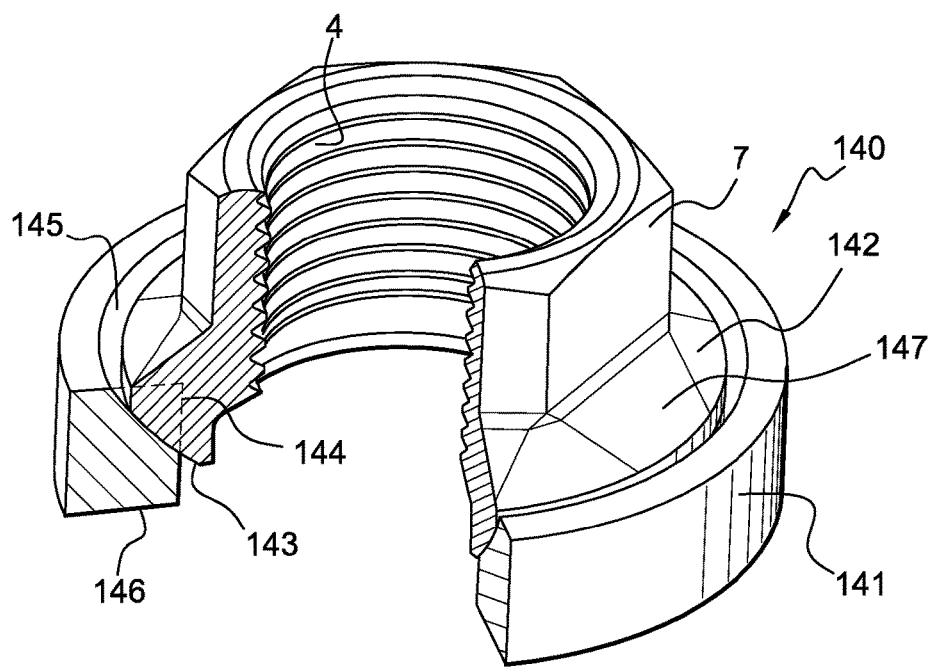
FIG. 12: a schematic representation of an oblique perspective view of an eighth example of a nut with a driving means according to the invention, fitted with a washer enabling swivelling.

FIG. 12 schematically represents an oblique perspective view of an eighth example of a nut with a driving means 140 according to the invention, fitted with a washer 141 enabling swivelling, The driving means 140 comprises a hexagonal shank 7 and a frustoconical collar 142 fitted with socket faces 147, in this case planar in shape. The socket faces 147 intersect the frustoconical collar 142. The cylindrical inner wall 4 of the machined nut 140 is threaded and may have a recess. The collar 142 has a spherical lower support surface 143, complemented and connected, in the same way as a ball and socket joint, with the washer 141 enabling swivelling. The washer 141 has a diameter greater than that of the collar 142. In one example, the section of the washer 141 is rectangular or even square in shape, from which an inner corner 144 in contact with the lower side 143 of the collar 142 has been bevelled into an arc of a circle. The washer 141 therefore has a concave housing 145 in the shape of a portion of a sphere, so as to accommodate the spherical support collar 142. Therefore, when the driving means 140 is screwed around a screw to tighten an element, an inner side 146, in this case flat in shape, of the inserted washer 141 is supported by said element, even if the screw axis is not perpendicular to the surface of the element being tightened in the tightening zone. The misalignment of a central axis of the washer 141 with regard to the screwing axis can have a value of more or less ten degrees.

Figure 13:
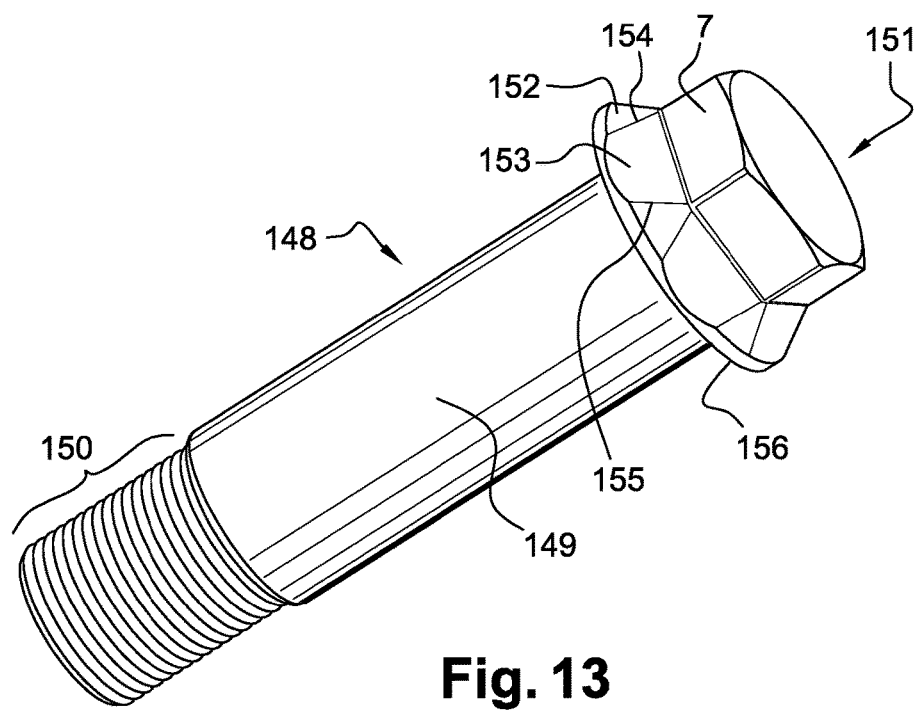
FIG. 13: a schematic representation of an oblique perspective view of an example of a screw with a driving means according to the invention.

FIG. 13 schematically represents an oblique perspective view of an example of a screw 148 with a driving means according to the invention. The screw 148 comprises a shaft 149 of which at least one part 150 is threaded, and a polygonal driving means 151 present in the form of a screw head. The head 151 comprises a polygonal shank 7, in this case hexagonal in shape, and an inbuilt frustoconical collar 152 obtained by forging using a die or by machining. In order to optimise the wrenching height, according to the invention, the collar 152 comprises socket faces 153, in this case planar in shape, aligned with the lateral sides of the shank 7 of the head 151 of the screw 148. The socket faces 153 intersect the frustoconical collar 152 and thus form, at these junctions, elliptical segments 154 and 155. A circular lower side 156 of the collar 152 is preferably flat so as to press against an element being tightened. All of the profiles used for the driving means in FIGS. 3 to 11 can also be used for the head 151 of the screw 148. A classic washer or a washer such as that seen in the previous figure in the case of a spherical support collar, can be inserted between the lower side 156 and said element being tightened.

The invention claimed is:

1. An assembly of a washer and a monolithic nut, wherein the monolithic nut comprises a polygonal shank with lateral sides and an inner wall on the polygonal shank having cylindrical threads along the inner wall of the polygonal shank, the monolithic nut having a frustoconical collar having a spherical lower portion and a bottom surface wherein the threads and the bottom surface are configured such that a threading movement of the nut along a mating threaded surface puts the spherical lower portion into contact with the washer, such that the contact places an axial load on the spherical lower portion of the collar, an upper-most collar surface opposite the bottom surface and a frustoconical curved surface between the bottom surface and the upper-most collar surface, wherein the frustoconical collar comprises a plurality of socket faces hollowed out from and relative to the frustoconical curved surface in an area between the bottom surface and the upper-most collar surface and wherein the socket faces extend to a plane defined by the respective polygonal shank lateral side, each lateral side of the polygonal shank being aligned with a respective hollowed-out socket face, and each lateral side of the polygonal shank terminates at a substantially transverse surface between the lateral side and a respective hollowed-out socket face at the intersection of the upper-most collar surface and the polygonal shank.

2. The assembly of claim 1 wherein the socket faces are planar.

3. The assembly of claim 1 wherein the nut is obtained by forging via a die, machining, casting, sintering or plastic injection molding.

4. The assembly of claim 1, further comprising fillets fitted between the socket faces of the frustoconical collar and the lateral sides of the polygonal shank.

5. The assembly of claim 1 wherein the nut is made out of titanium alloy, stainless steel, nickel alloy or aluminium alloy.

6. The assembly of claim 1, wherein the shank is hexagonal or bi-hexagonal.

7. The assembly of claim 6, wherein the frustoconical curved surface of the frustoconical collar forms an angle of at least forty-five degrees with a circular base of the collar.

8. The assembly of claim 1, wherein the socket faces are marked or colored.

* * * * *